United States Patent
Yang

(10) Patent No.: US 10,108,958 B2
(45) Date of Patent: *Oct. 23, 2018

(54) METHOD FOR PROCESSING A PAYMENT, AND SYSTEM AND ELECTRONIC DEVICE FOR IMPLEMENTING THE SAME

(71) Applicant: Chien-Kang Yang, Taipei (TW)

(72) Inventor: Chien-Kang Yang, Taipei (TW)

( * ) Notice: Subject to any disclaimer, the term of this patent is extended or adjusted under 35 U.S.C. 154(b) by 1042 days.

This patent is subject to a terminal disclaimer.

(21) Appl. No.: 13/959,971

(22) Filed: Aug. 6, 2013

(65) Prior Publication Data
US 2014/0129445 A1   May 8, 2014

(30) Foreign Application Priority Data
Nov. 8, 2012  (TW) .............................. 101141543 A

(51) Int. Cl.
  *G06Q 20/40*  (2012.01)
  *G06Q 20/02*  (2012.01)
(52) U.S. Cl.
  CPC ....... *G06Q 20/4012* (2013.01); *G06Q 20/027* (2013.01)
(58) Field of Classification Search
  USPC .............................. 705/75, 40, 35, 41, 26, 38
  See application file for complete search history.

(56) References Cited

U.S. PATENT DOCUMENTS

| | | | | |
|---|---|---|---|---|
| 5,445,295 A | * | 8/1995 | Brown | G07F 7/069 221/3 |
| 5,740,364 A | * | 4/1998 | Drerup | G06F 3/0481 705/41 |
| 8,396,794 B1 | * | 3/2013 | Mo | G06Q 20/10 235/375 |
| 8,538,845 B2 | * | 9/2013 | Liberty | G06Q 40/02 705/35 |

(Continued)

FOREIGN PATENT DOCUMENTS

| CN | 101165716 A | 4/2008 |
|---|---|---|
| CN | 101651675 A | 2/2010 |

(Continued)

OTHER PUBLICATIONS

Chinese Search Report dated May 16, 2016 for Chinese Patent Application No. 2012105536181 with English Translation.

(Continued)

*Primary Examiner* — Tien C Nguyen
(74) *Attorney, Agent, or Firm* — The Mueller Law Office, P.C.

(57) ABSTRACT

In a method for processing a payment, a seller-end electronic device transmits payment information to a transaction platform, which transmits an authentication code to the seller-end electronic device. A buyer-end electronic device allows the user thereof to input a verification code associated with the authentication code, and to transmit the verification code to the transaction platform. When the verification code is deemed valid, the buyer-end electronic device receives a (Continued)

personal identification number (PIN), and transmits a confirm signal to the transaction platform when the PIN is correct. The transaction platform then communicates with a bank terminal to process a payment, according to the payment information.

13 Claims, 10 Drawing Sheets

(56) References Cited

U.S. PATENT DOCUMENTS

| | | | | |
|---|---|---|---|---|
| 2005/0177507 A1* | 8/2005 | Bandych | ............... | G06Q 20/10 |
| | | | | 705/40 |
| 2006/0089903 A1* | 4/2006 | Ford | ............... | G06Q 40/02 |
| | | | | 705/38 |
| 2009/0099947 A1* | 4/2009 | Boehm | ............... | G06Q 20/10 |
| | | | | 705/35 |
| 2009/0138366 A1* | 5/2009 | Bemmel | ............... | G06Q 20/20 |
| | | | | 705/17 |
| 2011/0093351 A1 | 4/2011 | Afana | | |
| 2012/0203632 A1* | 8/2012 | Blum | ............... | G06Q 30/0255 |
| | | | | 705/14.53 |

FOREIGN PATENT DOCUMENTS

| | | |
|---|---|---|
| CN | 101727705 A | 6/2010 |
| CN | 102368338 A | 3/2012 |
| CN | 102768787 A | 11/2012 |
| EP | 1326187 A1 | 7/2003 |
| EP | 2521081 A1 | 11/2012 |
| JP | 2002-150236 A | 5/2002 |
| JP | 2002-297939 A | 10/2002 |
| JP | 2006-107138 A | 4/2006 |
| JP | 2006-155430 A | 6/2006 |
| WO | 2006055002 A1 | 5/2006 |

OTHER PUBLICATIONS

Search Report dated Sep. 30, 2014 for Taiwanese Application No. 101141543.

European Search Report dated Jan. 20, 2014 for EPO Application No. 13184208.0.

* cited by examiner

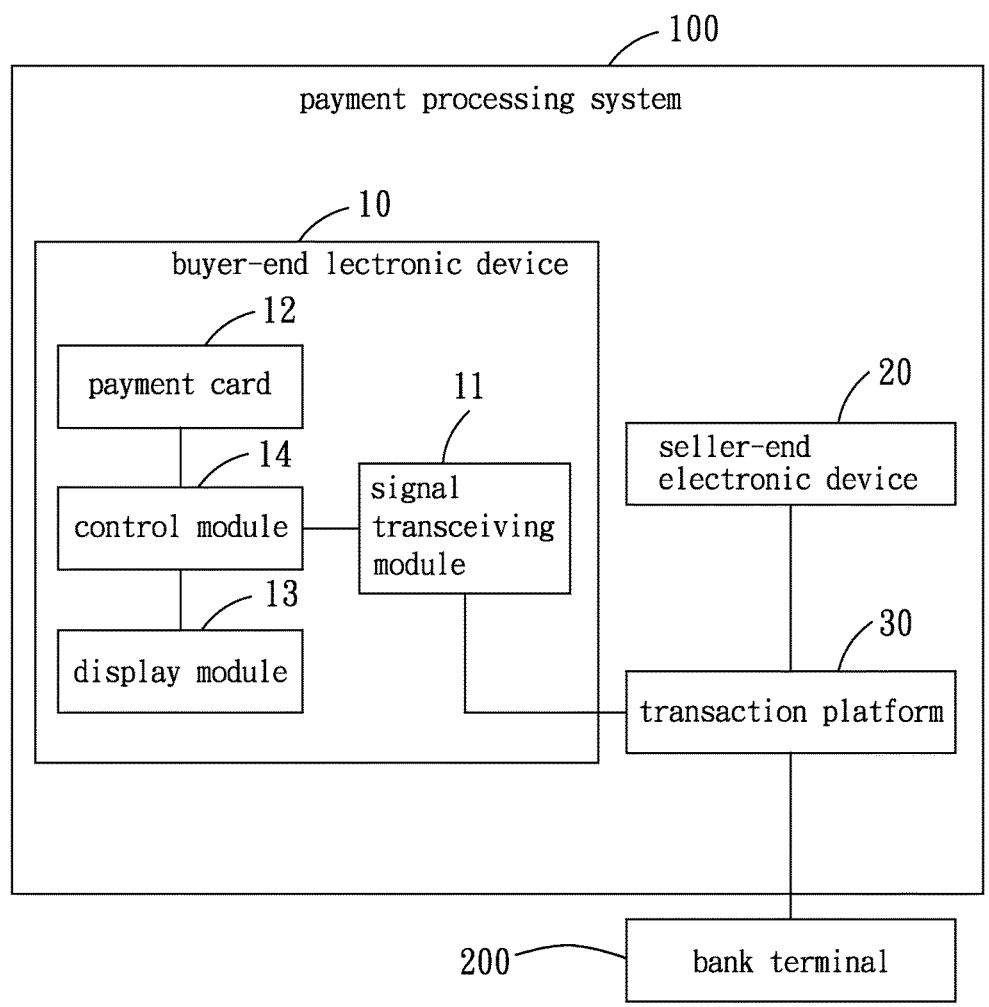
F I G. 2

METHOD FOR PROCESSING A PAYMENT, AND SYSTEM AND ELECTRONIC DEVICE FOR IMPLEMENTING THE SAME

CROSS-REFERENCE TO RELATED APPLICATION

This application claims priority of Taiwanese Application No. 101141543, filed on Nov. 8, 2012.

BACKGROUND OF THE INVENTION

1. Field of the Invention

The invention relates to a method, system and electronic device for executing a payment, more particularly to a method, system and electronic device for executing a payment with enhanced security.

2. Description of the Related Art

Nowadays, a number of ways are available to execute a payment for a typical transaction. For example, the payment can be done using physical money, such as coins and/or banknotes, or can be done using plastic money (in the form of a physical card, e.g., a credit card, a debit card, etc.). In addition to conventional face-to-face transactions, such payments can be also processed online.

It is known, however, that the current ways of executing the payment may have respective drawbacks. Physical money can be inconvenient to carry for a consumer, and for a party providing products and/or services in exchange for money, there is always a risk of loss attributed to receipt of counterfeit money. Plastic money is only usable in a limited environment that supports usage of plastic money (e.g., that accepts credit cards and that is equipped with a card reader), and may have various security problems, such as credit card fraud. Online transaction also involves plastic money, and further involves online transmission of highly important information such as a card number, an expiration date and a card security code (CRC). Such information may be intercepted by a malicious third party during transmission, thereby exposing a holder of the credit card to risk of monetary loss.

SUMMARY OF THE INVENTION

Therefore, one object of the present invention is to provide a method for processing a payment that does not involve physical cards to implement, and that provides enhanced security for the payment.

Accordingly, a method for processing a payment of the present invention may be implemented by a payment processing system. The payment processing system includes a buyer-end electronic device, a seller-end electronic device and a transaction platform operable to communicate with the buyer-end electronic device, the seller-end electronic device and a bank terminal. The method comprises the following steps of:

(a) configuring the seller-end electronic device to transmit, to the transaction platform, payment information that is associated with a transaction between users of the buyer-end and seller-end electronic devices, and configuring the transaction platform to transmit an authentication code to the seller-end electronic device;

(b) configuring the buyer-end electronic device to allow the user thereof to input a verification code that is provided by the user of the seller-end electronic device and that is associated with the authentication code, and to transmit the verification code thus received to the transaction platform;

(c) when it is determined by the transaction platform that the verification code conforms with the authentication code, configuring the transaction platform to transmit the payment information to the buyer-end electronic device;

(d) configuring the buyer-end electronic device to instruct the user of the buyer-end electronic device to input a personal identification number (PIN);

(e) configuring the buyer-end electronic device to transmit a confirm signal to the transaction platform when it is determined by the buyer-end electronic device that the PIN received in step (d) is correct; and (f) configuring the transaction platform to communicate with the bank terminal to process a payment for the transaction according to the payment information.

Another object of the present invention is to provide a payment processing system that is configured to execute the aforementioned method so as to process a payment for a transaction.

Accordingly, a payment processing system of the present invention comprises a buyer-end electronic device, a seller-end electronic device coupled to a payment card having a personal identification number (PIN) stored therein, and a transaction platform that is coupled to the buyer-end and seller-end electronic devices, and that is operable to communicate with a bank terminal.

The seller-end electronic device is configured to transmit, to the transaction platform, payment information that is associated with a transaction between users of the buyer-end and seller-end electronic devices. The transaction platform is configured to transmit an authentication code to the seller-end electronic device. The buyer-end electronic device is configured to allow the user thereof to input a verification code that is provided by the user of the seller-end electronic device and that is associated with the authentication code, and to transmit the verification code thus received to the transaction platform.

The transaction platform is further configured to transmit the payment information to the buyer-end electronic device when it is determined by the transaction platform that the verification code conforms with the authentication code. The buyer-end electronic device is further configured to instruct the user thereof to input the PIN, and to transmit a confirm signal to the transaction platform when it is determined by the buyer-end electronic device that the received PIN is correct. The transaction platform is further configured to communicate with the bank terminal to process a payment for the transaction according to the payment information.

Still another object of the present invention is to provide a buyer-end electronic device that is configured to execute the aforementioned method.

Accordingly, a buyer-end electronic device of the present invention is operable to communicate with a transaction platform for processing a payment for a transaction between a user of the buyer-end electronic device and a user of a seller-end electronic device. The buyer-end electronic device is coupled to a payment card having a personal identification number (PIN) stored therein. The buyer-end electronic device comprises a signal transceiving module configured to communicate with the transaction platform, a display module, and a control module coupled to the signal transceiving module, the display module and the payment card.

When the buyer-end electronic device is operated to process the payment for the transaction, the signal transceiving module is controlled by the control module to transmit to the transaction platform payment information that is associated with the transaction, and to receive from the transaction platform an authentication code. The signal transceiving module is further controlled by the control module to allow the user thereof to input a verification code that is provided by the user of the seller-end electronic device and that is associated with the authentication code, and to transmit the verification code thus received to the transaction platform.

When the verification code is deemed valid by the transaction platform, the display module is controlled by the control module to display the payment information and to instruct the user of the buyer-end electronic device to input the PIN.

When it is determined by the control module that the PIN thus received conforms with the PIN stored in the payment card, the signal transceiving module is further controlled by the control module to transmit a confirm signal and the PIN to the transaction platform, such that the transaction platform is configured to communicate with a bank terminal to process the payment for the transaction according to the payment information.

BRIEF DESCRIPTION OF THE DRAWINGS

Other features and advantages of the present invention will become apparent in the following detailed description of the preferred embodiments with reference to the accompanying drawings, of which:

FIG. 2 is a schematic block diagram of a payment processing system according to the first preferred embodiment;

DETAILED DESCRIPTION OF THE PREFERRED EMBODIMENTS

Figure 1:
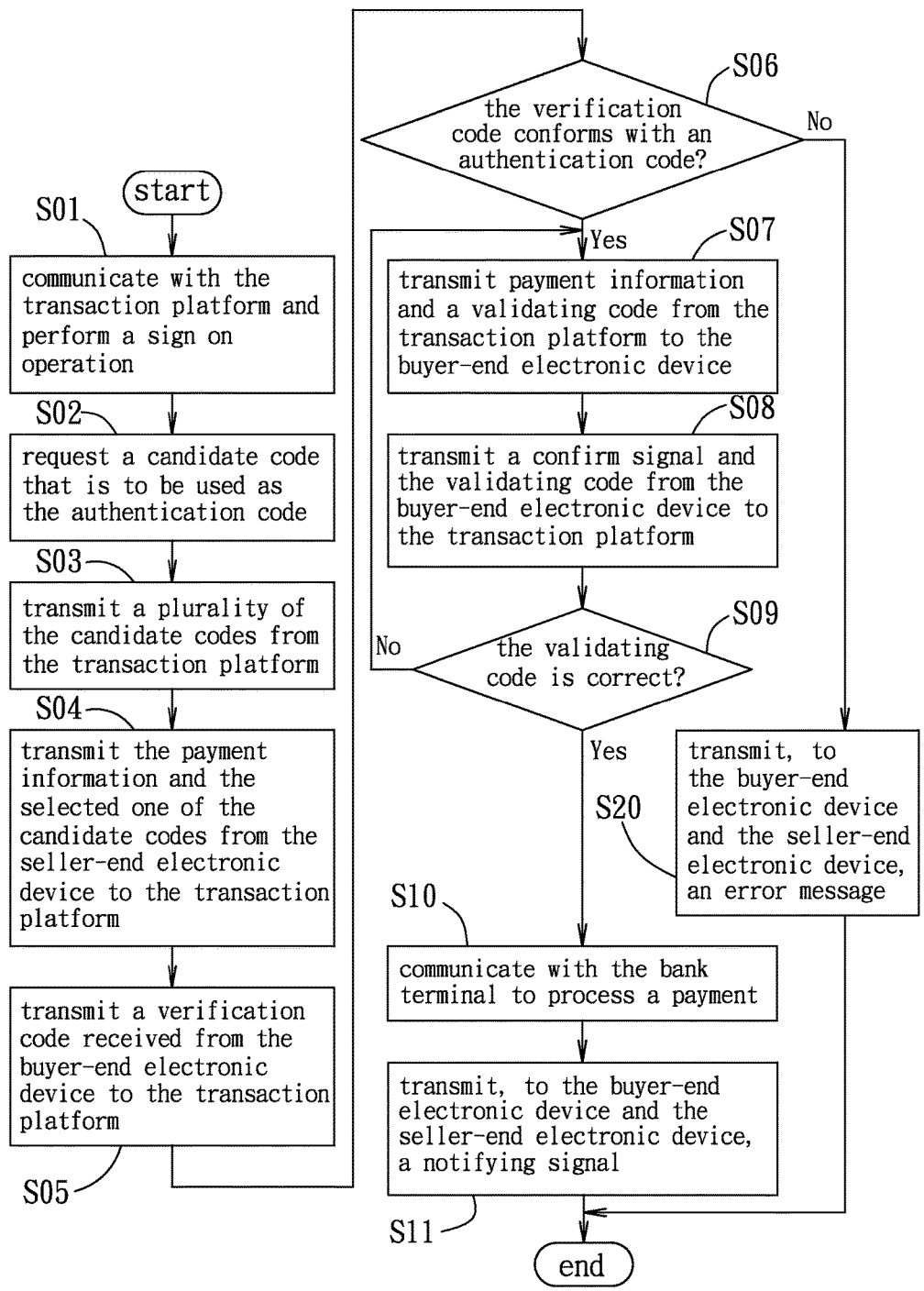
FIG. 1 is a flow chart of a first preferred embodiment of a method for processing a payment according to the invention.

As shown in FIGS. 1 and 2, the first preferred embodiment of a payment processing system 100 and a method for processing a payment according to the present invention is illustrated. The payment processing system 100 comprises a buyer-end electronic device 10, a seller-end electronic device 20, and a transaction platform 20 that is coupled to the buyer-end and seller-end electronic devices 10 and 20, and that is operable to communicate with a bank terminal 200. The method is used for processing a payment for a transaction between the users of the buyer-end electronic device 10 and the seller-end electronic device 20, and the payment processing system 100 supports both online transactions and face-to-face transactions.

In this embodiment, the buyer-end electronic device 10 is a mobile device (e.g., a smart phone, a tablet computer, etc.). In embodiments where the transaction takes place over a network (i.e., the buyer and the seller do not meet each other during the transaction), the buyer-end electronic device 10 may be, for example, a personal computer.

The buyer-end electronic device 10 is coupled to a payment card 12 (e.g., a specific product named "X card") having a personal identification number (PIN) stored therein, and includes a signal transceiving module 11, a display module 13, and a control module 14 coupled to the signal transceiving module 11, the display module 13 and the payment card 12.

The signal transceiving module 11 is configured to communicate with the transaction platform 30.

The payment card 12 may be a memory card module selected from a secure digital (SD) card, a mini SD card, a micro SD card, and a compact flash (CF) card, is verified by the bank terminal 200, and is configured to provide the function of conventional plastic money, although various card formats can be employed in other embodiments of this invention.

In this embodiment, the payment card 12 has a data chip (not shown in the Figures) that stores the PIN and a virtual account number and that conforms with FISC II standard. The virtual account number may be a codename designated by and associated with the user of the buyer-end electronic device 10. In particular, the virtual account number corresponds to a specific bank account that belongs to the user of the buyer-end electronic device 10, and rather than the actual bank account number, the virtual account number is transmitted between the buyer-end electronic device 10 and the bank terminal 200. As such, other than the bank terminal 200, no one is able to extract useful information from the virtual account number, and the actual bank account number can be made relatively more secure. In some embodiments, the PIN is a default number assigned by the bank terminal 200, and can be changed by the user using the buyer-end electronic device 10.

In some embodiments, various virtual account numbers that correspond respectively to various bank accounts owned by the user of the buyer-end electronic device 10 can be stored in the payment card 12, and the user of the buyer-end electronic device 10 may be offered the choice to select one of the bank accounts for making the payment.

The display module 13 is configured to provide information regarding the transaction to the user. The control module 14 includes an application for processing the transaction, and is configured to generate control signals to control operation of the signal transceiving module 11 and the display module 13 based on instructions of the application.

In this embodiment, the seller-end electronic device 20 is located in a common store (e.g., a department store, a convenience store, etc.) and includes a payment system (e.g. a shopping website server, a point of sale system, etc.) and an application programming interface (API) configured to allow communication with the transaction platform 30.

The transaction platform 30 can be located in a bank or an arbitrary third location to communicate with the buyer-end and seller-end electronic devices 10 and 20.

FIG. 1 illustrates steps of the method for processing a payment that is implemented by the payment processing system 100. The method will be executed when the payment processing system 100 is to process the payment for the transaction between users of the buyer-end and seller-end electronic devices 10 and 20 (being hereinafter referred to as a buyer and a seller, respectively).

In step S01, when powered on, the seller-end electronic device 20 is operable to execute the API so as to communicate with the transaction platform 30. Specifically, the seller-end electronic device 20 performs a sign on operation with the transaction platform 30. The sign on operation is required by the transaction platform 30 in order to ensure the seller-end electronic device 20 is a legitimate cooperating partner of the transaction platform 30. The transaction platform 30 may be configured such that only the devices that complete the sign on operation are allowed to communicate therewith. When the business hour of the seller is over, the seller-end electronic device 20 performs a sign off operation for terminating the communication with the transaction platform 30.

Afterwards, in step S02, when a transaction is to occur (i.e., the buyer is to purchase a product and/or service), the control module 14 executes the application, which in turn generates an authentication interface on the display module 13. The method requires the buyer to enter an authentication code in order to proceed with the payment.

The seller then operates the API to request a candidate code that is to be used as the authentication code. In response to the request, the transaction platform 30 is operable to generate and transmit a plurality of candidate codes to the seller-end electronic device 20 in step S03. Each of the candidate codes may have a predetermined length (e.g., 8 bits, 16 bits, etc.) and may be composed of alphabets, numerals, or a combination thereof.

Then, the seller inputs payment information associated with the transaction, and selects one of candidate codes received from the transaction platform as the authentication code via the seller-end electronic device 20. Upon receipt of the seller input of the payment information and the selection of the candidate codes, the seller-end electronic device 20 is operable, in step S04, to transmit the payment information and the selected one of the candidate codes to the transaction platform 30. At this time, the seller may provide the buyer with the selected one of the candidate codes. Each of the candidate codes selected for a particular transaction will not be selectable for subsequent transactions.

In this embodiment, the payment information includes a name of the product to be purchased, a store name and/or a merchant serial number, a specific method of payment, and a total amount of the payment. The merchant serial number is designated by the seller, and may have a default value. The total amount can be manually inputted by the seller, or obtained using a barcode scanner to scan barcodes that are attached to the products involved in the transaction. It is noted that additional relevant information may be incorporated to serve as the payment information in other embodiments of this invention.

In the case where the transaction takes place online and the buyer operates a personal computer serving as the buyer-end electronic device 10, the seller-end electronic device 20 is automatically operable, after the buyer purchases a product, to obtain the name of the product, the merchant serial number and the total amount of the payment as the payment information, to select one of the candidate codes, and to transmit the selected one of the candidate codes to the buyer-end electronic device 10. In such case, parts of the payment information can be provided by the buyer. The seller-end electronic device 20 is also operable to receive the parts of the payment information provided by the buyer.

In some embodiments, when a predetermined situation occurs, the seller-end electronic device 20 may be operable to actively request the transaction platform 30 to transmit a plurality of candidate codes to the seller-end electronic device 20. For example, the predetermined situation may be that a number of remaining ones of the candidate codes (i.e., that are not selected by the seller yet) is lower than a specific number (e.g., 10). The seller-end electronic device 20 then automatically transmits the request to the transaction platform 30, which generates and transmits a new set of candidate codes to the seller-end electronic device 20 in response to the request, in order to neutralize the predetermined situation. In some embodiments, such requests can be transmitted by the seller-end electronic device 20 periodically.

Figure 3:
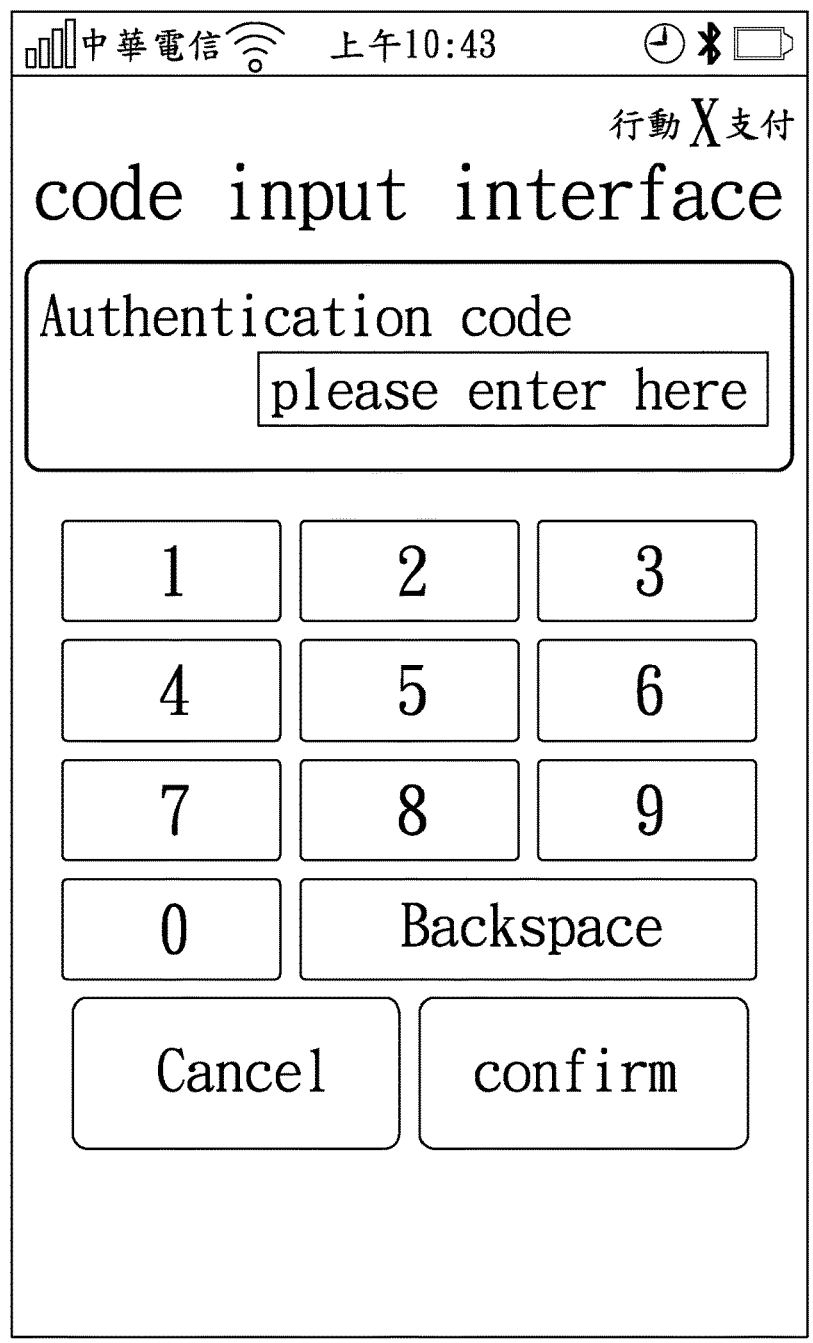
FIG. 3 illustrates a code input interface, via which a buyer may input a verification code.

In step S05, the application stored in the control module 14 is operable to generate a code input interface and to control the display module 13 to display the code input interface, as shown in FIG. 3. The buyer-end electronic device 10 is then operable to allow the buyer to input a verification code that is provided by the seller and that is associated with the authentication code, and to transmit the verification code thus received to the transaction platform 30.

In step S06, the transaction platform 30 is operable to determine whether the verification code received from the buyer-end electronic device 10 in step S05 conforms with the authentication code received from the seller-end electronic device 20 in step S04. When such determination is affirmative, the flow proceeds to step S07. Otherwise, the flow proceeds to step S20, in which the transaction platform 30 transmits an error message to the buyer-end and seller-end electronic devices 10 and 20 for notifying the parties of the transaction that the verification code was not correct, and the method is terminated.

In step S07, the transaction platform 30 is operable to transmit the payment information and a validating code to the buyer-end electronic device 10, enabling the display module 13 of the buyer-end electronic device 10 to display a confirmation interface to the buyer. The reason for requiring the buyer to input the validating code is to confirm that the buyer-end electronic device 10 is actually operated by the buyer and is not hijacked and controlled by malicious software.

Figure 4:
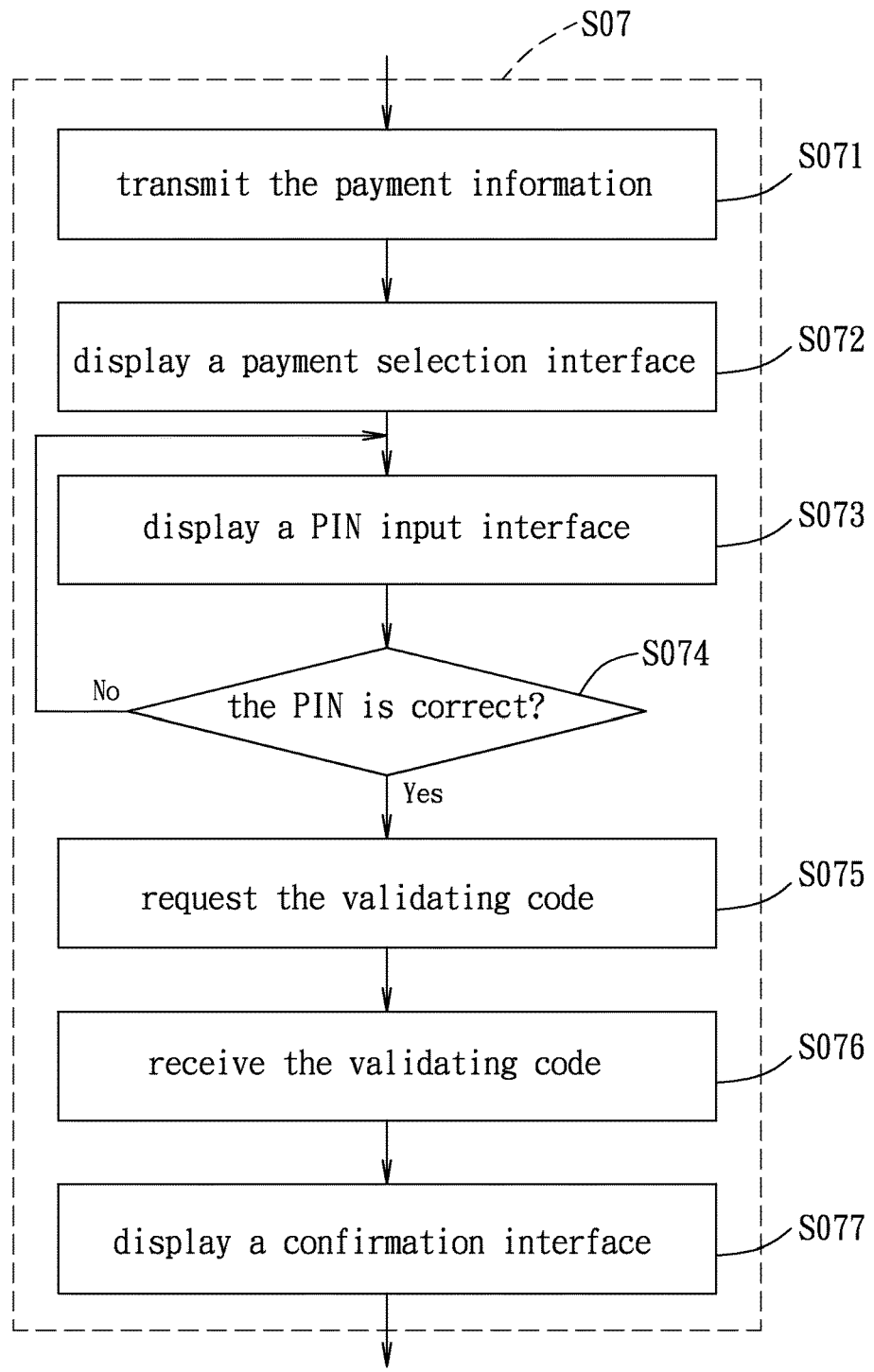
FIG. 4 is a flow chart illustrating sub-steps of step S07 in the method of FIG. 1.

In this embodiment, the validating code is a completely automated public Turing test to tell computers and humans apart (CAPTCHA). FIG. 4 illustrates detailed sub-steps of step S07.

First, in sub-step S071, the transaction platform 30 is operable to transmit the payment information to the buyer-end electronic device 10, from which the correct verification code is received.

Figure 5:
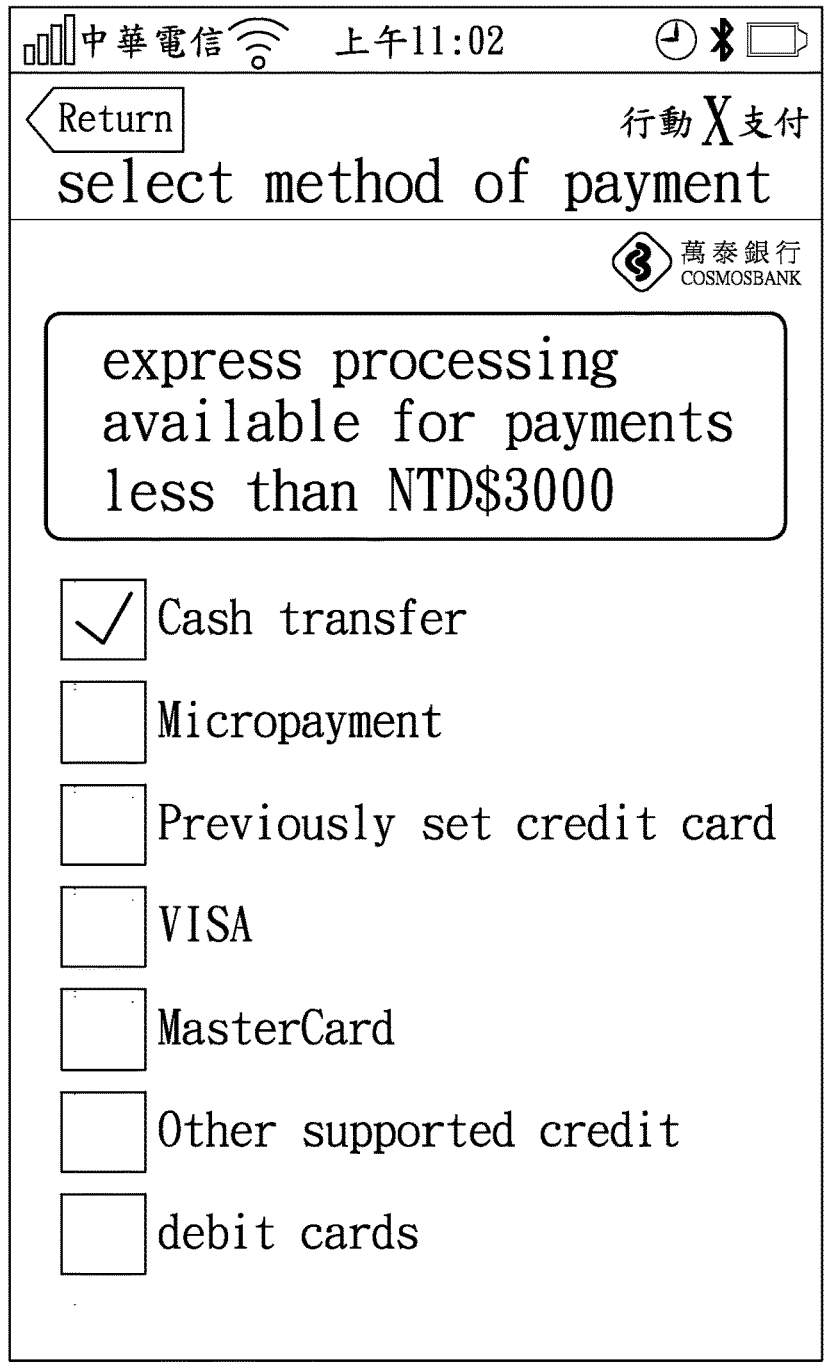
FIG. 5 illustrates a payment selection interface, via which the buyer may select from a number of available ways of payment.

Afterwards, in sub-step S072, the display module 13 of the buyer-end electronic device 10 displays a payment selection interface for allowing the buyer to select from a number of ways to make the payment. An exemplary payment selection interface is shown in FIG. 5, in which the ways to make the payment includes cash transfer, micropayment, a credit card/debit card that is previously set by the buyer, and other credit cards/debit cards that are acceptable to the seller.

Figure 6:
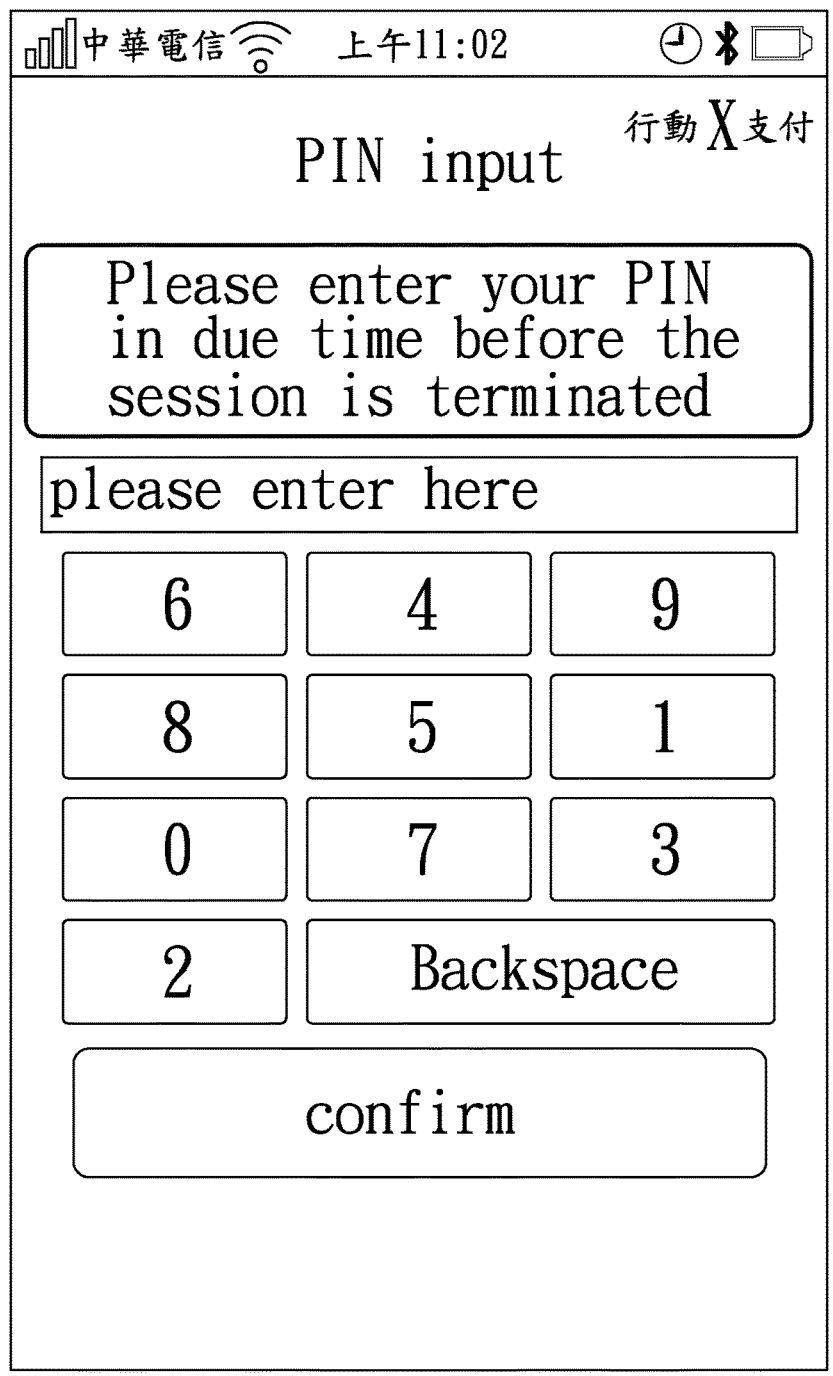
FIG. 6 illustrates a personal identification number (PIN) input interface, via which the buyer is instructed to input a PIN.

When one of the ways is selected (for example, the buyer opts to make the payment using cash transfer), in sub-step S073, the display module 13 displays a PIN input interface that instructs the buyer to input a PIN (as shown in FIG. 6). The control module 14 of the buyer-end electronic device 10 is then operable to determine whether the PIN is correct (i.e., conforms with the PIN stored in the payment card 12) in sub-step S074. If the PIN is not correct, the control module 14 controls the display module 13 to display an invalid PIN message, and sub-step S073 is repeated. In some examples, when an incorrect PIN is inputted a number of times in succession, the method is terminated.

When the PIN received in sub-step S073 is correct, the flow proceeds to sub-step S075, in which the control module 14 requests the validating code from the transaction platform 30 through the signal transceiving module 11. In response to the request, the transaction platform 30 generates the validating code and transmits the same back to the buyer-end electronic device 10 in sub-step S076.

Figure 7:
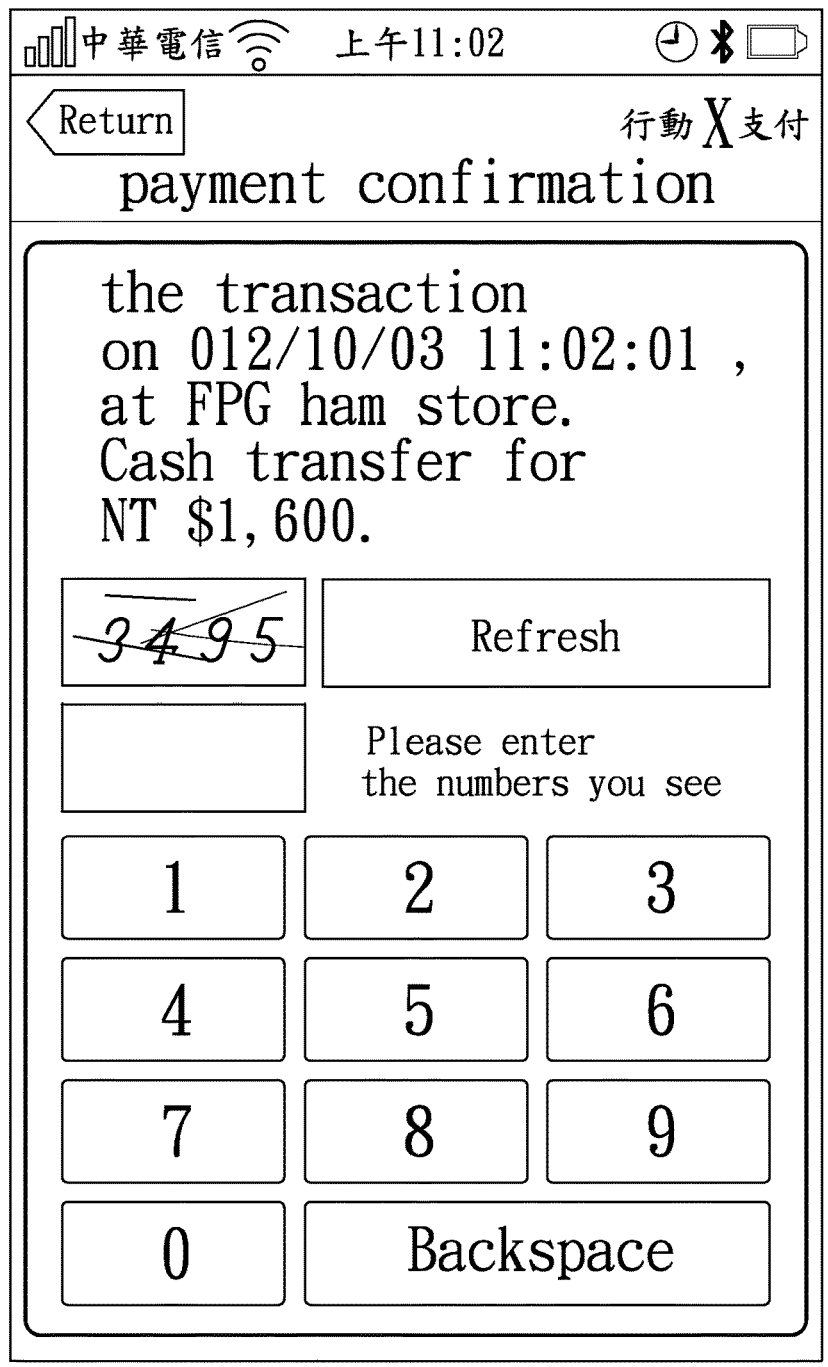
FIG. 7 illustrates a confirmation interface, via which the buyer may confirm the payment by inputting a validating code.

The buyer-end electronic device 10 then generates a confirmation interface for display by the display module 13 in sub-step S077. As shown in FIG. 7, the confirmation interface includes the payment information, and requires the buyer to input the validating code that is received from the transaction platform 30 for confirming the payment. In this embodiment, when the validating code is unreadable to the buyer, the confirmation interface is provided with an option to regenerate the validating code (the flow thus goes back to sub-step S075).

In some examples, the confirmation interface may include a virtual keyboard displayed on the display module 13. The virtual keyboard may include a randomly generated keyboard layout for security reasons. The keyboard layout may be randomly generated each time the buyer touches a key for further enhancing security.

Afterwards, in step S08, the control module 14 controls the signal transceiving module 11 to transmit a confirm signal and the validating code to the transaction platform 30. The confirm signal is for notifying the transaction platform 30 that the buyer has confirmed the payment and that the transaction platform 30 may proceed to process the payment. It is noted that the PIN is only stored in the payment card 12 instead of the buyer-end electronic device 10, and is not transmitted across the devices of the payment processing system 100. Accordingly, any third party is prevented from intercepting the PIN during the data transmission. Moreover, once the payment card 12 is detached from the buyer-end electronic device 10, the PIN cannot be obtained from the buyer-end electronic device 10.

In step S09, the transaction platform 30 is operable to determine whether the validating code received in step S08 is correct, and to execute step S10 when the determination is affirmative. Otherwise, the flow goes back to step S08 to instruct the buyer to input the validating code again. In some embodiments, the flow goes back to sub-step S075 to regenerate another validating code. In some embodiments, the method is terminated when the determination made in step S08 is negative.

In step S10, the transaction platform 30 is operable to communicate with the bank terminal 200 to process the payment for the transaction according to the payment information.

Figure 8:
FIG. 8 illustrates a notifying signal indicating that the payment is processed.

Subsequently, in step S11, when the payment is successfully processed, the transaction platform 30 is operable to transmit, to the buyer-end electronic device 10 and/or the seller-end electronic device 20, a notifying signal notifying that the payment has been processed. One example of such notifying signal transmitted to the buyer-end electronic device 10 can be that shown in FIG. 8.

For the buyer-end electronic device 10, the notifying signal may include a payment serial number, a bank receipt number, a bank account of the buyer associated with the payment, date/time of the payment, the merchant serial number/store name, and the total amount of the payment. Additional relevant information may be included in the notifying signals in other embodiments of this invention.

The method further informs the buyer of the details regarding the payment, and allows the buyer to confirm the payment using the buyer-end electronic device 10 before processing the payment. As a result, each payment processed using the method is authorized by the buyer, and cannot be launched by a malicious third party who is not in possession of the buyer-end electronic device 10. Thus, the method provides enhanced security. Moreover, since the method does not involve a card reader and the credit card and/or the debit card of the buyer being given to the seller, related security risks can be significantly reduced.

The seller-end electronic device 20 may acquire the authentication codes from the transaction platform 30 using a number of ways. For example, the transaction platform 30 may transmit a plurality of the authentication codes to the seller-end electronic device 20 as soon as a connection is established between the transaction platform 30 and the seller-end electronic device 20. The seller-end electronic device 20 may actively request the transaction platform 30 to transmit a plurality of the authentication codes to the seller-end electronic device 20. Such request may also be transmitted to the transaction platform 30 periodically.

In some embodiments, during the transaction, the virtual account number corresponding to a specific bank account that belongs to the buyer is transmitted in place of the actual bank account number of the buyer, and the correspondence of the virtual account number and the actual bank account number is only known to the buyer and the bank terminal 200. Thus, even though the virtual account number is exposed to threat for being intercepted by a third party, personal information of the buyer is still made relatively secure.

Figure 9:
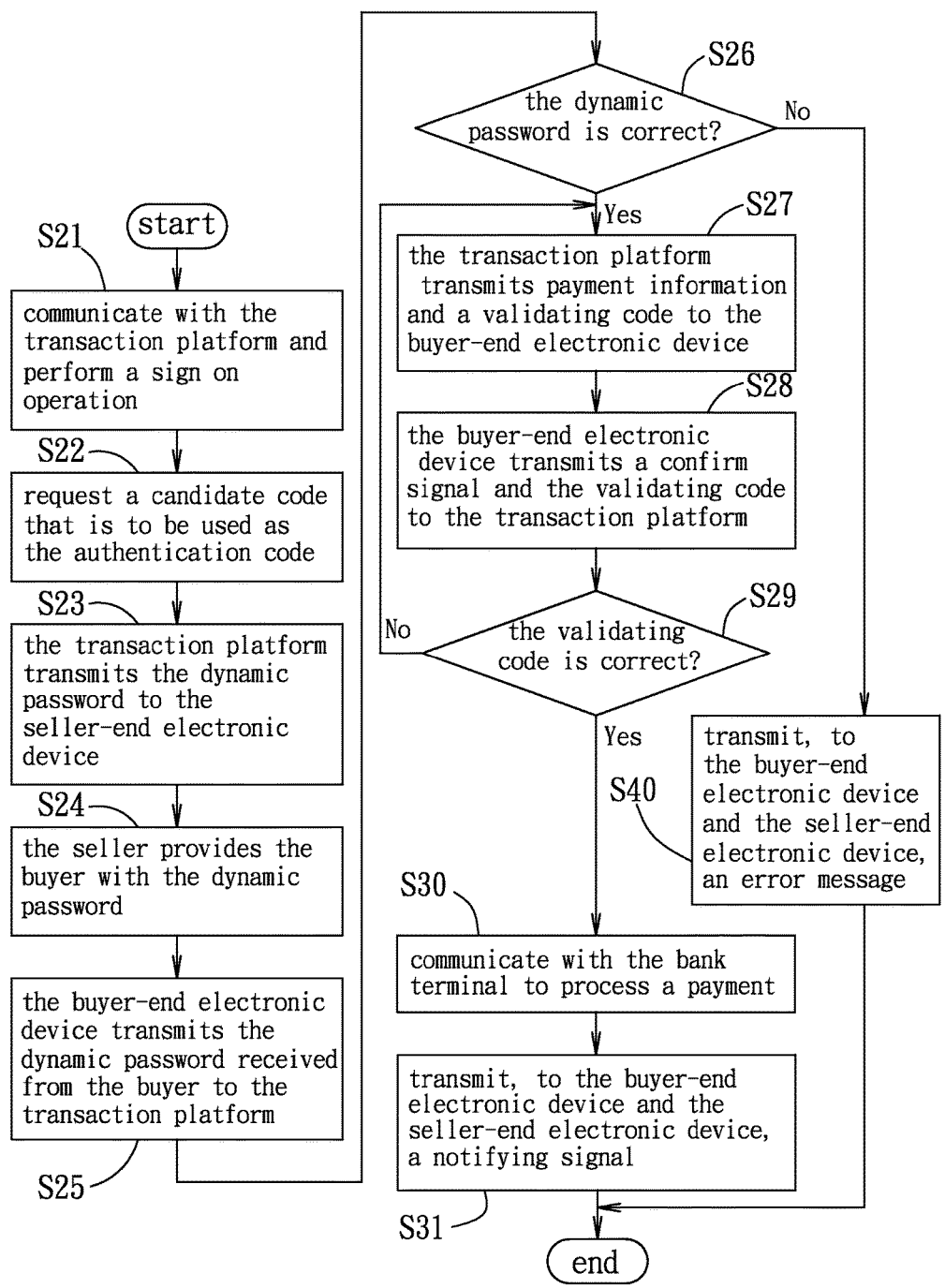
FIG. 9 is a flow chart of a second preferred embodiment of a method for processing a payment according to the invention.

As shown in FIG. 9, the second preferred embodiment of the method for processing a payment according to the present invention is similar to the first embodiment. The main difference between this embodiment and the first preferred embodiment resides in the following.

In step S21, when powered on, the seller-end electronic device 20 is operable to execute the API so as to communicate with the transaction platform 30. Similar to the previous embodiment, the seller-end electronic device 20 performs the sign on operation with the transaction platform 30 in order to ensure the seller-end electronic device 20 is a legitimate cooperating partner of the transaction platform 30.

Afterwards, in step S22, when a transaction is to occur (i.e., the buyer is to purchase a product and/or service), the control module 14 executes the application, which in turn generates an authentication interface on the display module 13. The method requires the buyer to enter an authentication code in order to proceed with the payment.

The seller may then operate the API so that the seller-end electronic device 20 requests a dynamic password, which is to be used as the authentication code, in step S22. In this embodiment, the dynamic password is a one-time password (OTP) that is generated by the transaction platform 30 upon request of the seller-end electronic device 20.

The seller-end electronic device 20 is further operable to allow the seller to input the payment information, and to transmit the payment information and the request to the transaction platform 30. In response to the request of the dynamic password from the seller-end electronic device 20, the transaction platform 30 is operable, in step S23, to dynamically generate the dynamic password according to the payment information, and to transmit the dynamic password to the seller-end electronic device 20 as the authentication code in step S23.

Then, the seller provides the buyer with the dynamic password received. The dynamic password may have a predetermined length and may be composed of alphabets, numerals, or a combination thereof. In step S24, buyer-end electronic device 10 in turn allows the buyer to input the dynamic password via the code input interface (FIG. 3) as the authentication code, and transmits the dynamic password thus received to the transaction platform 30.

In step S25, the transaction platform 30 is operable to determine whether the dynamic password received from the buyer-end electronic device 10 in step S24 is correct. When the determination is affirmative, the flow proceeds to step S26. Otherwise, the flow proceeds to step S40, which is similar to step S20 of the first preferred embodiment.

Afterwards, in this embodiment, steps s26 to S30 are similar to steps S07 to S11, respectively. Therefore, details thereof are omitted herein for the sake of brevity.

The second preferred embodiment has the same advantages as those of the first preferred embodiment.

Figure 10:
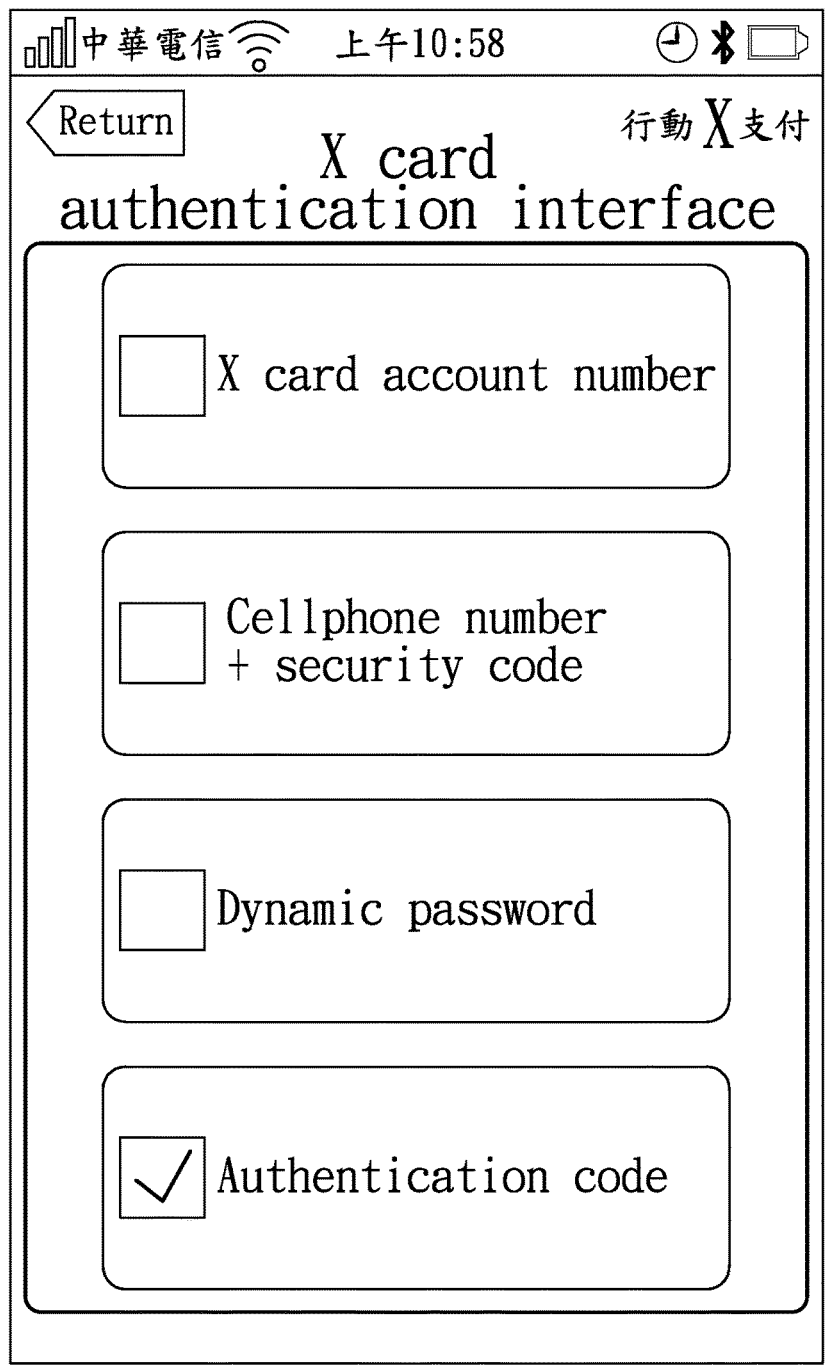
FIG. 10 illustrates an authentication interface displayed on a buyer-end electronic device of the payment processing system.

In some embodiments, depending on various sellers, a number of options that can be used as the authentication code may be provided the buyer. An exemplary authentication interface may be as shown in FIG. 10. Accordingly, the buyer may choose to input one of a personal account number associated with the payment card 12 ("X card account number"), a combination of a phone number of the buyer-end electronic device 10 and a security code, and the authentication code (that includes the candidate codes and the dynamic password). Once the seller acknowledges the selection made by the buyer, the seller can operate the API to make an associated request.

In some embodiments, the seller-end electronic device 20 may be a mobile device.

In some embodiments, the payment processing system 100 may comprise a plurality of the seller-end electronic devices 20, and a central server that is coupled to the seller-end electronic devices 20. Data transmission between each of the seller-end electronic devices 20 and the transaction platform 30 can be processed through the central server. Such a payment processing system 100 is applicable in larger stores (e.g., a warehouse store, a wholesale store, etc.).

To sum up, embodiments of this invention allow a number of ways for the buyer to authenticate the payment, and subsequently generate the corresponding verification code for the buyer, thus enhancing the security of the payment. Additionally, the payment card 12 according to embodiments of this invention has the PIN and the virtual account number stored therein. As a result, during the payment, personal information of the buyer is not transmitted among the devices of the payment processing system 100, further providing enhanced security for the payment. Moreover, since the physical card of the buyer is not actually given to the seller in the transaction, the buyer does not need to bring the credit card/debit card, and the seller does not need to prepare an additional card reader for implementing the method of this invention.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. A method for processing a payment for a face-to-face transaction, to be implemented by a payment processing system including a buyer-end electronic device, a seller-end electronic device and a transaction platform operable to communicate with the buyer-end electronic device, the seller-end electronic device and a bank terminal, said method comprising the following steps of:

(a) transmitting, by the seller-end electronic device, to the transaction platform payment information that is associated with a transaction between users of the buyer-end and seller-end electronic devices, and transmitting, by the transaction platform, an authentication code to the seller-end electronic device;

(b) displaying, by the buyer-end electronic device, an interface that instructs the user thereof to input a verification code that is provided by the user of the seller-end electronic device and that is associated with the authentication code, and transmitting, by the buyer-end electronic device, the verification code thus received to the transaction platform;

(c) comparing, by the transaction platform, the verification code and the authentication code, and transmitting the payment information to the buyer-end electronic device when it is determined by the transaction platform that the verification code conforms with the authentication code based on the comparing;

(d) instructing, by the buyer-end electronic device, the user of the buyer-end electronic device to input a personal identification number (PIN);

(e) transmitting, by the buyer-end electronic device to transmit a confirm signal to the transaction platform when it is determined by the buyer-end electronic device that the PIN received in step (d) is correct;

(f) communicating, by the transaction platform, with the bank terminal to process a payment for the transaction according to the payment information; and (g) when the payment is successfully processed, transmitting, by the transaction platform, to the buyer-end electronic device and the seller-end electronic device a notifying signal notifying that the payment has been processed.

2. The method of claim 1, wherein step (a) includes the following sub-steps of:

(a1) communicating, by the seller-end electronic device, with the transaction platform;

(a2) transmitting, by the transaction platform, a plurality of the candidate codes to the seller-end electronic device; and (a3) instructing, by the seller-end electronic device, the user thereof to input the payment information, and to transmit the payment information to the transaction platform;

wherein the method further comprises, before step (b), the steps of selecting, by the seller-end electronic device, one of the candidate codes as the authentication code, and transmitting a selected one of the candidate codes to the transaction platform.

3. The method of claim 2, wherein:

step (b) includes associating the verification code with the selected one of the candidate codes; and step (c) includes determining, by the transaction platform, whether the verification code conforms with the selected one of the candidate codes that is transmitted to the transaction platform in sub-step (a3).

4. The method of claim 2, wherein, sub-step (a2) includes:
actively requesting, by the seller-end electronic device, the transaction platform to transmit a plurality of the candidate codes to the seller-end electronic device; and
transmitting, by the transaction platform, the candidate codes to the seller-end electronic device in response to the request.

5. The method of claim 2, wherein, sub-step (a2 includes periodically generating and transmitting, by the transaction platform, the candidate codes to the seller-end electronic device.

6. The method of claim 1, wherein step (a) includes the following sub-steps of:
(a1) communicating, by the seller-end electronic device, with the transaction platform;
(a2) instructing, by the seller-end electronic device, the user thereof to input the payment information, and transmitting the payment information to the transaction platform; and
(a3) dynamically generating, by the transaction platform, a dynamic password according to the payment information, and transmitting the dynamic password to the seller-end electronic device as the authentication code.

7. A payment processing system for processing a payment for a face-to-face transaction, said payment processing system comprising a buyer-end electronic device coupled to a payment card having a personal identification number (PIN) stored therein, a seller-end electronic device, and a transaction platform coupled to said buyer-end and seller-end electronic devices and operable to communicate with a bank terminal, wherein:
said seller-end electronic device is programmed to transmit, to said transaction platform, payment information that is associated with a transaction between users of said buyer-end and seller-end electronic devices;
said transaction platform is programmed to transmit an authentication code to said seller-end electronic device;
said buyer-end electronic device is programmed to display an interface that instructs the user of said buyer-end electronic device to input a verification code that is provided by the user of said seller-end electronic device and that is associated with the authentication code, and to transmit the verification code thus received to said transaction platform;
said transaction platform is further programmed to compare the verification code and the authentication code, and transmit the payment information to the buyer-end electronic device when it is determined by said transaction platform that the verification code conforms with the authentication code based on the comparing;
said buyer-end electronic device is further programmed to instruct the user of said buyer-end electronic device to input the PIN, and to transmit a confirm signal to said transaction platform when it is determined by said buyer-end electronic device that the received PIN is correct;
said transaction platform is further programmed to communicate with the bank terminal to process a payment for the transaction according to the payment information; and
when the payment is successfully processed, said transaction platform is further programmed to transmit to said buyer-end electronic device and said seller-end electronic device a notifying signal notifying that the payment has been processed.

8. The payment processing system of claim 7, wherein said seller-end electronic device is programmed to:
communicate with said transaction platform for receiving a plurality of the candidate codes therefrom;
instruct the user thereof to input the payment information;
select one of the candidate codes as the authentication code; and
transmit the payment information and a selected one of the candidate codes to said transaction platform.

9. The payment processing system of claim 8, wherein the verification code is associated with the selected one of the candidate codes, and said transaction platform is programmed to determine whether the verification code conforms with the selected one of the candidate codes that is transmitted to said transaction platform.

10. The payment processing system of claim 8, wherein said seller-end electronic device is programmed to actively request said transaction platform to transmit a plurality of the candidate codes to said seller-end electronic device, and said transaction platform is programmed to transmit the candidate codes to said seller-end electronic device in response to the request.

11. The payment processing system of claim 8, wherein said transaction platform is programmed to periodically generate and transmit the candidate codes to said seller-end electronic device.

12. The payment processing system of claim 7, wherein:
said seller-end electronic device is further programmed to communicate with said transaction platform, to instruct the user thereof to input the payment information, and to transmit the payment information to said transaction platform; and
said transaction platform is further programmed to dynamically generate the authentication code according to the payment information, and to transmit the authentication code to said seller-end electronic device.

13. The payment processing system of claim 7, wherein at least one of said buyer-end and seller-end electronic devices is a mobile device.

* * * * *